US008713321B2

(12) United States Patent
Brown

(10) Patent No.: US 8,713,321 B2
(45) Date of Patent: Apr. 29, 2014

(54) METHOD AND APPARATUS FOR VERIFIABLE GENERATION OF PUBLIC KEYS

(75) Inventor: Daniel R. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 0 days.

(21) Appl. No.: 13/618,060

(22) Filed: Sep. 14, 2012

(65) Prior Publication Data

US 2013/0013916 A1 Jan. 10, 2013

Related U.S. Application Data

(63) Continuation of application No. 10/974,802, filed on Oct. 28, 2004.

(60) Provisional application No. 60/514,687, filed on Oct. 28, 2003.

(51) Int. Cl.
*H04L 9/32* (2006.01)
*H04L 29/06* (2006.01)
*H04L 9/08* (2006.01)

(52) U.S. Cl.
USPC ............ 713/171; 713/155; 380/278; 380/280

(58) Field of Classification Search
USPC .......... 380/277–280; 713/150–153, 155, 168, 713/170–171
See application file for complete search history.

(56) References Cited

U.S. PATENT DOCUMENTS

| 5,199,070 | A | 3/1993 | Matsuzaki et al. |
| 5,323,146 | A | 6/1994 | Glaschick |
| 5,371,794 | A | 12/1994 | Diffie et al. |
| 5,515,441 | A * | 5/1996 | Faucher ............................ 380/30 |
| 6,212,281 | B1 | 4/2001 | Vanstone |
| 6,233,687 | B1 | 5/2001 | White |
| 6,279,110 | B1 * | 8/2001 | Johnson et al. ................. 713/180 |
| 6,341,349 | B1 | 1/2002 | Takaragi et al. |
| 6,446,207 | B1 | 9/2002 | Vanstone et al. |
| 7,035,015 | B2 | 4/2006 | Teijido |

(Continued)

FOREIGN PATENT DOCUMENTS

| EP | 0918274 A2 | 5/1999 |
| JP | 4-504020 A | 7/1992 |

(Continued)

OTHER PUBLICATIONS

Holger, P.; "Self-certified keys—Concepts and Applications"; in Proc. Communications and Multimedia Security '97; 1997; Postdoctoral fellowship paper of the NATO Scientific Committee disseminated by the DAAD, Paris, France; Online at http://citeseerx.ist.psu.edu/viewdoc/summary?doi+10.1.1.56.7129.

(Continued)

*Primary Examiner* — Darren B Schwartz
(74) *Attorney, Agent, or Firm* — Wilfred P. So; Blake, Cassels & Graydon LLP

(57) ABSTRACT

The invention provides a method of verifiable generation of public keys. According to the method, a self-signed signature is first generated and then used as input to the generation of a pair of private and public keys. Verification of the signature proves that the keys are generated from a key generation process utilizing the signature. A certification authority can validate and verify a public key generated from a verifiable key generation process.

19 Claims, 7 Drawing Sheets

(56) References Cited

U.S. PATENT DOCUMENTS

| | | | |
|---|---|---|---|
| 7,480,795 B2 | 1/2009 | Vanstone | |
| 8,108,678 B1* | 1/2012 | Boyen | 713/176 |
| 2001/0008013 A1* | 7/2001 | Johnson et al. | 713/170 |
| 2002/0007453 A1* | 1/2002 | Nemovicher | 713/155 |
| 2002/0108042 A1 | 8/2002 | Oka et al. | |
| 2002/0152385 A1 | 10/2002 | Vanstone et al. | |
| 2003/0081785 A1 | 5/2003 | Boneh et al. | |
| 2003/0084298 A1* | 5/2003 | Messerges et al. | 713/176 |
| 2003/0123655 A1* | 7/2003 | Lambert et al. | 380/28 |
| 2003/0152218 A1* | 8/2003 | Coron et al. | 380/30 |
| 2003/0179885 A1 | 9/2003 | Gentry et al. | |
| 2004/0010700 A1* | 1/2004 | Mont | 713/189 |
| 2004/0081321 A1* | 4/2004 | Struik | 380/278 |
| 2004/0123098 A1* | 6/2004 | Chen et al. | 713/155 |
| 2004/0131191 A1 | 7/2004 | Chen et al. | |
| 2004/0151317 A1 | 8/2004 | Hyyppa et al. | |
| 2004/0221158 A1* | 11/2004 | Olkin et al. | 713/170 |

FOREIGN PATENT DOCUMENTS

| | | | |
|---|---|---|---|
| JP | 4-216587 A | 8/1992 | |
| JP | 11-174957 A | 7/1999 | |
| JP | 2001-523067 A | 11/2000 | |
| JP | 2001-520483 A | 10/2001 | |
| JP | 2001-522071 A | 11/2001 | |
| JP | 2002-508529 A | 3/2002 | |
| JP | 2003-521154 A | 8/2003 | |
| JP | 2005-509366 A | 4/2005 | |
| WO | WO 99/20020 A1 | 4/1999 | |
| WO | WO 99/23781 A1 | 5/1999 | |
| WO | WO 99/25092 A1 | 5/1999 | |
| WO | WO 99/49612 A1 | 9/1999 | |
| WO | WO 01/95068 A2 * | 6/2001 | G06F 1/00 |
| WO | WO 01/54346 A1 | 7/2001 | |
| WO | WO 01/95068 A2 | 12/2001 | |
| WO | WO 03/041338 A1 | 5/2003 | |

OTHER PUBLICATIONS

Pintsov, L. et al.; "Postal Revenue Collection in the Digital Age"; 2000; pp. 105-120; Springer-Verlag; Online at http://citeseerx.ist.psu.edu/viewdoc/summary?doi+10.1.1.103.7648.

Brown, D.R.L. et al.; "Provably Secure Implicit Certificate Schemes"; Parallel and Distributed Processing and Applications: Second International Symposium, ISPA 2004 Proceedings; Dec. 13-15, 2005; Hong Kong; LNCS; pp. 156-165; vol. 2339; Jan. 2002; Springer-Verlag; ISBN: 978-3-540-24128-7.

Smart, N. P. et al.; "A wearable public key infrastructure (WPKI)"; Proceedings of the Fourth International Symposium on Wearable Computers (ISWC'00); 2000; pp. 127-133; IEEE.

Johnson, D. et al.; "Elliptic Curve DSA (ECDSA): An Enhanced DSA"; 1998.

Carnerero Alvaro, F.; Supplementary Search Report from corresponding European Application No. 04789786.3; search completed Sep. 30, 2010.

Takamoto, Y.; "Taiou me-ra fueru S. MIME denshi shomei de hon-nin wo ninsho [*Corresponding mailer verifying the identity using increasing S/MIME electronic signatures*]"; Nikkei Byte; Nikkei BP; Sep. 22, 1997; No. 169; pp. 206-215.

Yamaguchi et al.; Jouhou security [*Information security*]; Kyoritsu-Shuppan K.K.; Sep. 20, 2000; First edition; pp. 250-251.

Ikeno, S. et al.; Gendai Angou Riron [*Today's Cryptography Theory*]; Institute of Electronics and Communication Engineers of Japan; Sep. 1, 1986; First Edition; pp. 218-220.

Extract from English translation of Office Action dated Jan. 17, 2013 from corresponding Japanese Application No. 2011-23146.

* cited by examiner

METHOD AND APPARATUS FOR VERIFIABLE GENERATION OF PUBLIC KEYS

CROSS-REFERENCE TO RELATED APPLICATIONS

This application is a continuation of U.S. patent application Ser. No. 10/974,802 which was filed on Oct. 28, 2004, which claims priority from U.S. Provisional Application No. 60/514,687 which was filed on Oct. 28, 2003, all of which are incorporated herein by reference.

FIELD OF THE INVENTION

The present invention relates to a method and apparatus for verifiable generation of public keys.

DESCRIPTION OF THE PRIOR ART

When communicating in a communication system that operates over a public network, cryptographic techniques are often used to secure communications. Cryptography can provide secrecy and/or authentication through encryption and digital signatures respectively. In public key cryptographic systems, a user's key includes a private key and a mathematically related public key. It is infeasible to determine the private key given only the public key. The public keys for all entities can be published or otherwise distributed to other correspondents in the communication system.

Accepted good practices for public keys include public key validation (PKV) and proof-of-possession (POP) for the associated private key. These practices are considered to be useful tests that prevent potential abuse of public keys.

Public key validation includes testing a purported public key for conformance to its type of public key. This testing may or may not involve participation of the holder of associated private key. Public key validation helps assure that use of the purported public key is safe, provided that various other security measures are in place.

Proof of possession involves one party demonstrating to another party that it knows the private key associated with a given public key. This is often accomplished through providing a digital signature dependent upon the private key. Successful verification of the signature proves knowledge of the private key.

Neither public key validation nor proof of possession excludes the possibility that the private key was (a) stolen or (b) generated with insufficient randomness. When keys are stolen, it may contribute to identity theft, public key theft, and similar undesirable frauds. Insufficient randomness is a common problem in computers, especially smart cards and other constrained devices. Insufficient randomness can lead to guessable or duplicate private keys, which dramatically undermines security.

It is an object of the present invention to obviate or mitigate the above disadvantages.

SUMMARY OF THE INVENTION

The inventor has developed a method of performing "verifiable key generation." Using the method, a first party can generate its key pair in a way that allows others to verify that the first party actually generated the key rather than stole it. A trusted authority can also participate in the verifiable key generation process to provide additional randomness in the key pair.

The inventor has recognized that verifiable key generation helps to exclude the above possibilities of stolen keys and insufficient randomness.

In one aspect of the invention, there is provided a method of verifiable key generation of public keys. According to the method, a self-signed signature is first generated and then used as input to the generation of a pair of private and public keys. Verification of the signature proves that the keys are generated from a key generation process utilizing the signature. A computer readable medium is also provided for storing a program executable on a computer for implementing this and other aspects of the invention.

A typical use of Public Key Validation (PKV), Proof of Possession (POP) and verifiable key generation is during a certification of a public key. In a certification, a subject, namely a user or requester, requests a certificate from an issuer, or certification authority (CA). The subject generates a key pair, possibly with the assistance of the CA to obtain sufficient randomness. The subject may also generate additional information useful for validating the public key and for verifying the generation of the key. The subject they signs the public key or a signature message to form what is called a certificate request, and sends this with the other information to the CA. The CA confirms the identity of the subject, verifies the signature in the certificate request, validates the public key and verifies the generation of the key pair. On the CA is satisfied it issues a certificate.

One embodiment of the verifiable key generation builds upon the existing digital signature techniques. A self-signed signature is defined as a message that is signed and the message itself contains a copy of the signature. The present invention includes a method to simultaneously generate a self-signed signature and a key pair, whereby the verification of the self-signed signature assures that the key pair was generated (i.e. not stolen).

If a trusted authority includes some randomness in the message then sufficient randomness is ensured. To enhance the security of the key pair owner, the signature verification can be modified with a salt and a long computation to help prevent exhaustive searches of the key pair owner's contribution of randomness to the key pair.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
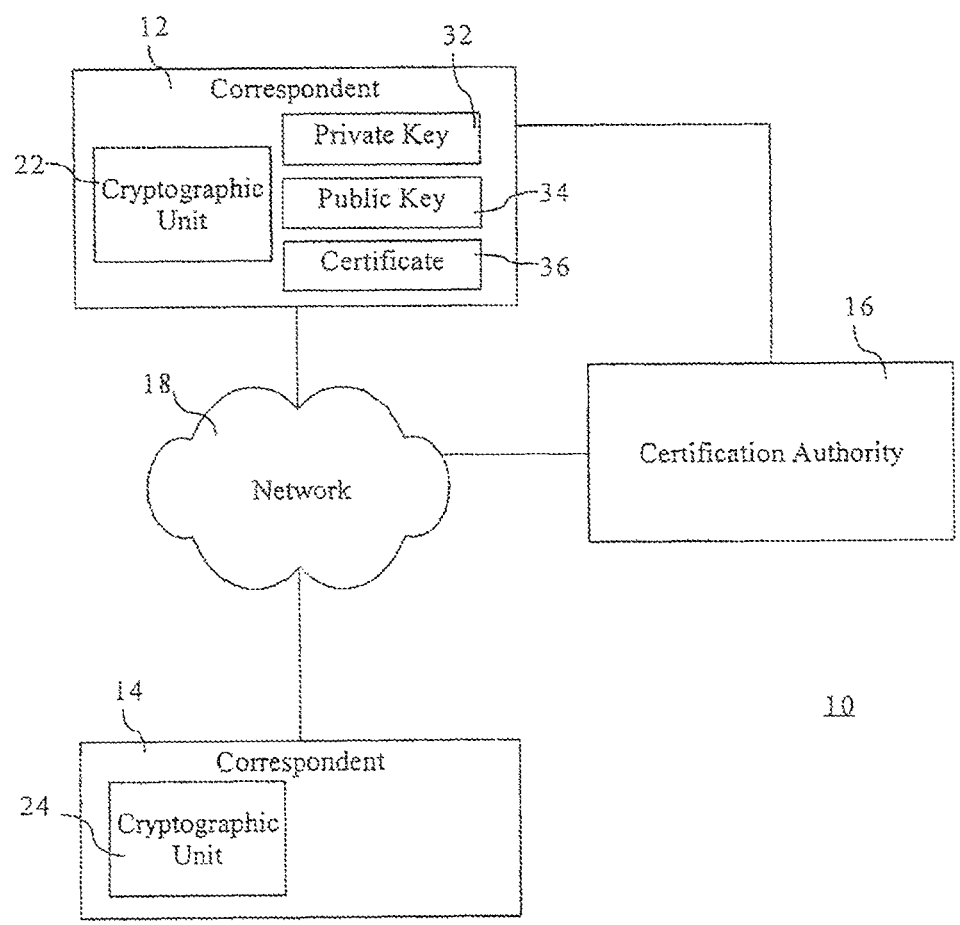
FIG. 1 is a schematic representation of a communication system.

Referring to FIG. 1, a communication system is shown generally by the numeral 10. The communication system includes a pair of correspondents 12, 14 and a certification authority 16. Each correspondent 12, 14 has a respective cryptographic unit 18, 20 for performing cryptographic operations. The correspondent 12 has a private key 22 and a corresponding public key 24. The certification authority 16 issues a certificate 26 which certifies the public key 24 as will be described further below. The certificate 26 can be shared with the correspondent 14 in order to provide the correspondent 14 with the public key 24 and cryptographic assurances as will be described below.

The correspondents in FIG. 1 may perform a number of cryptographic protocols to achieve various cryptographic goals, particularly to generate the private key 22, public key 24, and certificate 26.

"Self-Signed Signatures" and "Verifiable Key Generation"

The correspondents may perform the following method for generating a "self-signed signature" based on various digital signature algorithms such as DSA and ECDSA. For convenience, the method is described in terms of ECDSA.

Figure 2:
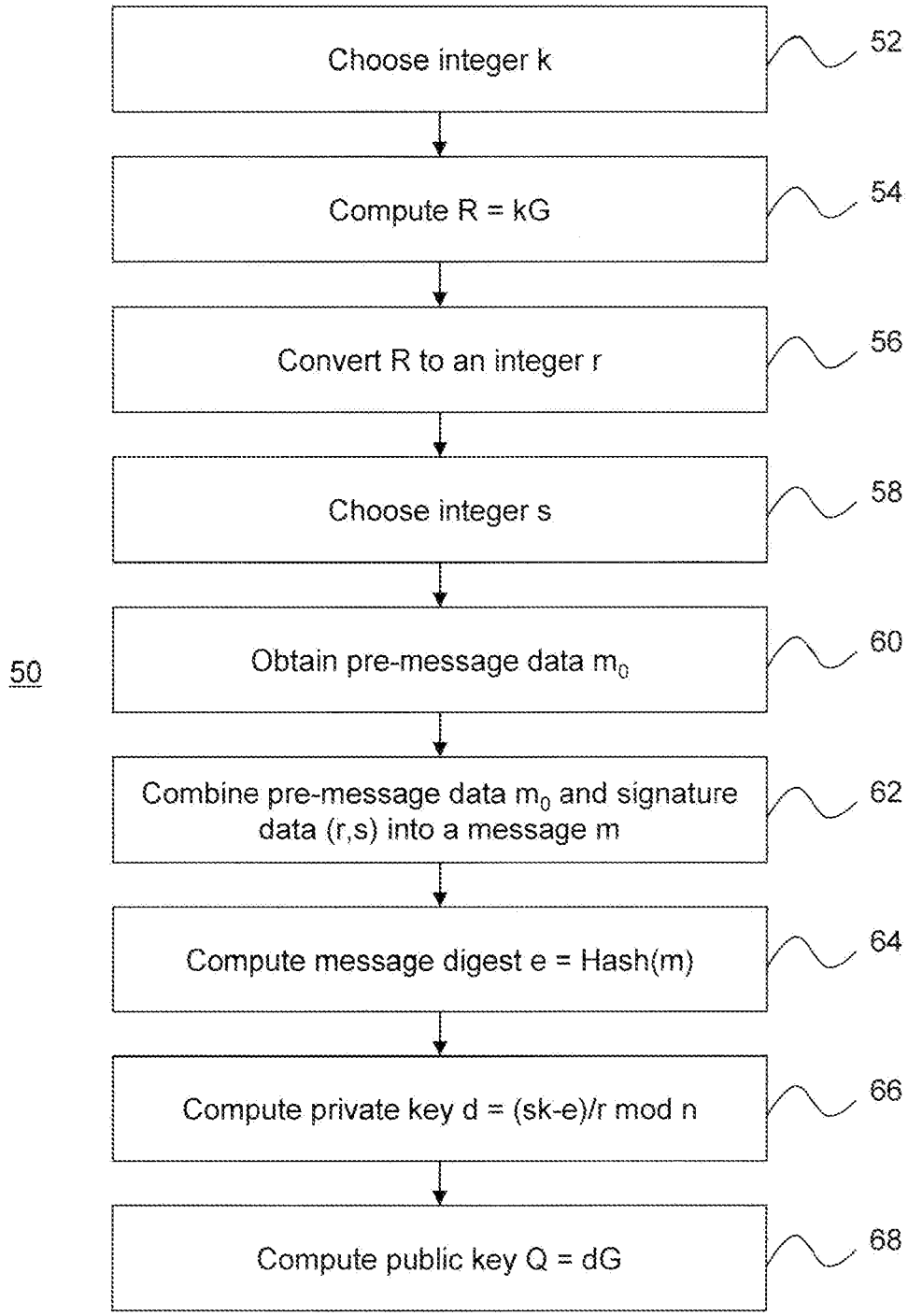
FIG. 2 is a flowchart showing a key generation performed in the communication system of FIG. 1.

Referring to FIG. 2, a method of generating a self-signed signature performed by the correspondent 12 is shown generally by the numeral 50. Following ECDSA procedures, a point G of order n on an elliptic curve defined over $Z_p$ is first selected. Here n is a large prime number. At step 52, the correspondent 12 chooses an integer k at random in the interval [0, n−1]. The correspondent then computes an elliptic curve point R=kG at step 54. Here R is referred to as the signature ephemeral public key and k is referred to as the ephemeral private key.

The signature data (r,s) contain two integers, r and s. An integer value corresponding to the elliptic curve point R is assigned to integer r at step 56. As will be understood, a number of methods may be employed, including, that specified by ECDSA, to convert the elliptic curve point R into an integer. The correspondent chooses at step 58 an integer s in the interval [0, n−1], preferably at random.

Then, it obtains pre-message data $m_0$ at step 60. The pre-message data $m_0$ can be any message data. It may be a message to be signed. It may contain information relating to the owner of the verifiable keys. It also may contain information received from an outside source, such as randomness provided by a certification authority to be contributed to the resulting key pair. The correspondent then combines, for example, by concatenation, the pre-message data $m_0$ and the signature data (r,s) into a self-signed signature message m at step 62.

The correspondent computes a message digest e=Hash(m) at step 64, where the function Hash is a cryptographic hash function that gives an integer result. The correspondent computes a private key from the message digest e using a formula d=(s k−e)/r mod n at step 66. A public key is computed from the value of the private key using the formula Q=d G at step 68. It is noted that the public key may also be expressed as Q=(1/r mod n)(s R−e G) using the above formula for the private key d.

To summarize, the method described above includes the following steps:
1. Choose some integer A (randomly from [0, n−1], for example).
2. Compute the elliptic curve point R=kG, the signature ephemeral public key.
3. Convert R to an integer r.
4. Choose some integer s (randomly from [0, n−1], for example).
5. Take some pre-message data $m_0$ (which may contain information from outside sources, such as randomness).
6. Combine pre-message $m_0$ and signature data (r, s) into a message m (by concatenation, for example).
7. Compute the message digest e=Hash(m) in integer form.
8. Compute a private key d=(s k−e)/r mod n.
9. Compute a public key Q=d G. (Alternatively, Q=(1/r mod n)(s R−e G).)

If the ECDSA verification algorithm is applied to a triplet, or triple (m, (r, s), Q), the result of the verification algorithm is that the triple is a valid signature. Because the signed message in contains the signature (r, s), the signature is a "self-signed signature".

Given an already existing public key Q of another party, finding a new self-signed signature is tantamount to forging a signature, which is considered infeasible. Furthermore, even using a pre-existing private key d, supposing an adversary were to steal the private key, finding a new self-signed signature is infeasible, because generation of the self-signed signature results in a new private key, which will almost certainly not be the old private key.

Therefore a self-signed signature constitutes "verifiable key generation". Following the ECDSA verification algorithm, verification of the signature proves that the key generation process above was used and excludes the possibility the private key was merely stolen or re-used from another source.

Key Generation with Verifiable Randomness

In verifiable key generation with a self-signed signature, the message $m_0$ influences the value of the key pair, and by contributing to part of this message, a trusted authority such as the certification authority can supplement the randomness of the key pair to a level sufficient to the desired security level. This is especially useful if the key pair owner is constrained in its capability of generating randomness.

The trusted authority generates data t, which the key pair generator includes in $m_0$. The value t include sufficient randomness according to the desired security level.

The value t should be conveyed to the key pair generator securely, because the security the key pair depends to some extent on t. To convey t securely is to convey t with confidentiality and authenticity.

One way to convey t with authenticity is to have t contain a digital signature. The key pair generator can verify the signature to ensure that it originates from the trusted authority. (If t originates from an adversary, security will be weakened considerably.) Generally the digital signature also provides the necessary randomness as well, because it depends on the private key of the trusted authority. If a probabilistic signature algorithm, such as ECDSA, is used then further randomness can be present. Therefore, it can be sufficient for t to consist entirely of a digital signature. The message signed for the purpose of t can be a combination of messages from the authority and the key generator.

Confidential conveyance of t can be achieved through various means. Encryption can be used, provided that a secure channel can be established. The key pair generator can generate temporary session key and send this securely to the trusted authority using the authority's public key. Independence of the temporary public key from the key being verifiably generated is important.

Typically, the trusted authority would also be a CA and would authenticate the key pair generator using some non-cryptographic methods.

Figure 3:
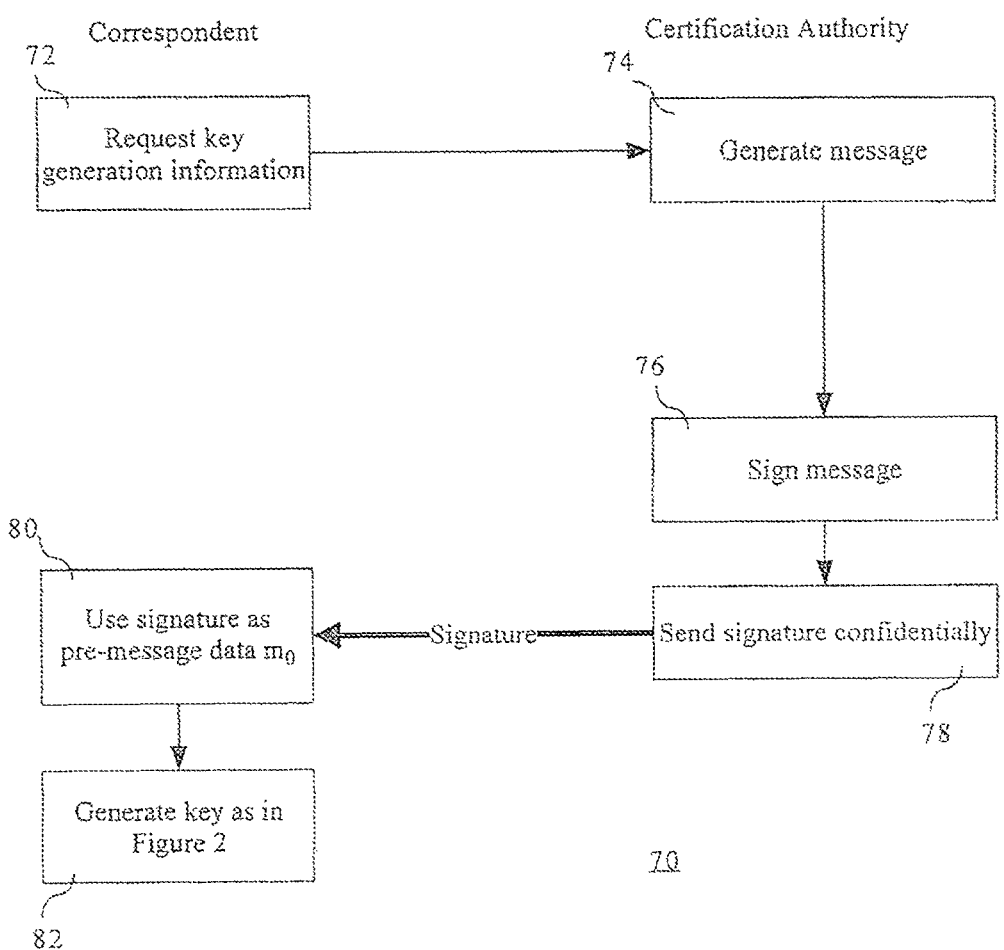
FIG. 3 is a flowchart showing a variation on a step in FIG. 2.

Referring therefore to FIG. 3, a method of providing the pre-message $m_0$ is shown generally by the numeral 70. The correspondent first requests information related to key generation from the certification authority at step 72. In response to this request, the certification authority generates a message at step 74. As noted above, the message can be generated solely by the certification authority or it may be a combination of messages from the correspondent and the certification authority. When a combination is used, the request made at step 72 includes a message from the correspondent to be included in the certification authority message.

The certification authority then signs the message at step 76 with its own key to obtain a CA signature. The CA signature is sent to the correspondent over a secure channel at step 78. The secure channel may be accomplished by encryption as described above. The correspondent then uses the signature as pre-message data $m_0$. The correspondent then proceeds to generate a key pair and self-signed signature using the method of FIG. 2 with the signature used at step 60.

Protecting the Key Pair Generator's Weak Secret

If the key pair generator uses a self-signed signature for verifiable key generation and the secret value k generated in the method of FIG. 2 is insufficiently random, then the security problem below results. This security problem can be mitigated with a slight modification of the ECDSA algorithm used in the self-signed signature as will be described in detail below with reference to FIG. 4.

The security problem is that if an adversary can guess k and has copies of r, s, and m, which would be the case if the adversary is the trusted authority or another user who wishes to verify the key generation, then the adversary can recover the private key with the same formula the key pair generator uses.

Figure 4:
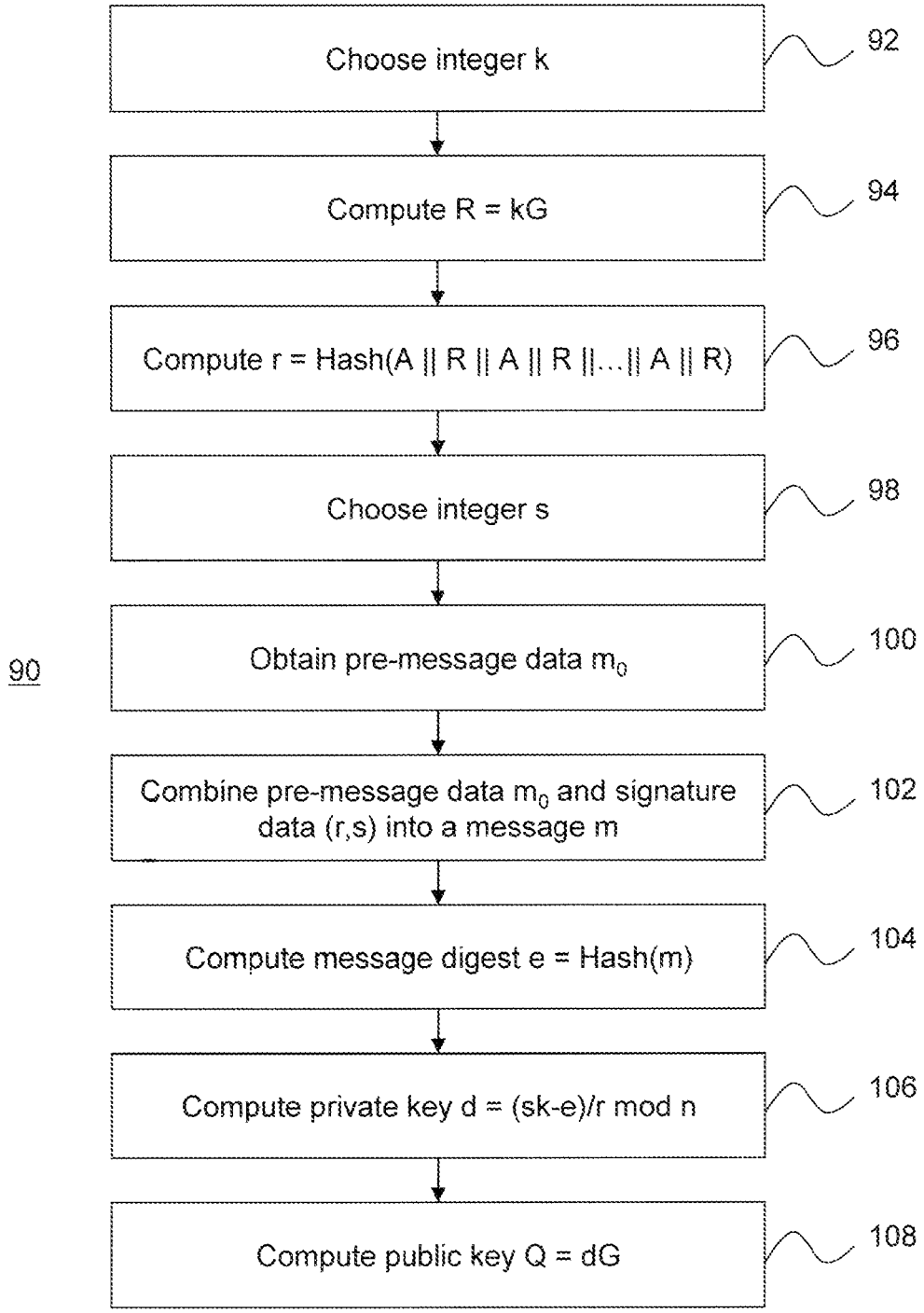
FIG. 4 is a flowchart showing another embodiment of a key generation method performed in the communication system of FIG. 1.

To make exhaustive guessing of k as difficult as possible, the method of FIG. 2 is modified as shown in FIG. 4. The steps in the method of FIG. 4 are similar to those in FIG. 2.

At step 92, the correspondent 12 chooses an integer k at random in the interval [0, n−1]. The correspondent then computes an elliptic curve point R=kG, referred to as the signature ephemeral public key at step 94.

At step 96, the correspondent computes r=Hash (A∥R∥A∥R∥ . . . ∥A∥R), where the number of repetitions can be made as large as is wanted and is convenient, and "∥" denotes concatenation of bit strings. The larger the number of repetitions, the longer the calculation takes. Each guess of k requires one computation of r. A long calculation therefore forces an adversary who is trying to guess k to do more work. Therefore the preferred number of repetitions is the largest that the correspondent and CA can tolerate. The value A is a salt value, and is unique to the key pair generator. The salt ensures that function from k to r is unique to the key pair generator, which prevents the adversary from building a dictionary of computed values that is re-usable for different key pair generators.

The correspondent chooses at step 98 an integer s at random in the interval [0, n−1]. Then, it obtains pre-message data $m_0$ at step 100. The pre-message data $m_0$ may contain randomness to be contributed to the resulting key pair. The correspondent then concatenates the pre-message data $m_0$ and the signature data (r,s) into a message m at step 102. The correspondent computes a message digest e=Hash(m) at step 104, where the function Hash is a cryptographic hash function that gives an integer result. The correspondent computes a private key d=(s k−e)/r mod n at step 106, and a public key Q=d G at step 108. It is noted that the public key may also be expressed as Q=(1/r mod n)(s R−G) using the above formula for the private key d.

Other correspondents or the certification authority may verify the modified self-signed signature. The verifier first computes an elliptic curve point R'=(1/s mod n)(eG+rQ), which is part of the ECDSA verification process. This requires a copy of the message in and the public key Q. The verifier needs the salt A and the number of repetitions that the key pair generator used to compute r. The verifier then computes r'=Hash (A∥R'∥A∥R'∥ . . . ∥A∥R'). If r'=r, the verifier accepts the signature, other the verifier rejects it.

Other lengthy calculations may also be necessary to deter an adversary from guessing k exhaustively. An adversary can use the formula for the private key d=(s k−e)/r mod n and knowledge of the public key Q to check guesses for the secret k and thus for the private key d. To slow this approach of guessing k, the message in can be chosen in the form m=r∥s∥t∥r∥s∥t∥ . . . ∥r∥s∥t. Then the calculation of e as e=Hash (m) takes a long time and has to be done separately for each guess of k. The form of the message m does not require any further modification to the digital signature algorithm used.

These two methods combined help protect the key pair owner's private from the trusted authority who generates t and any other party who obtains m, r, s and Q, such as parties that want to verify the generation of Q independently from the trusted authority.

An Alternative to Using a Self-Signed Signature

Figure 5:
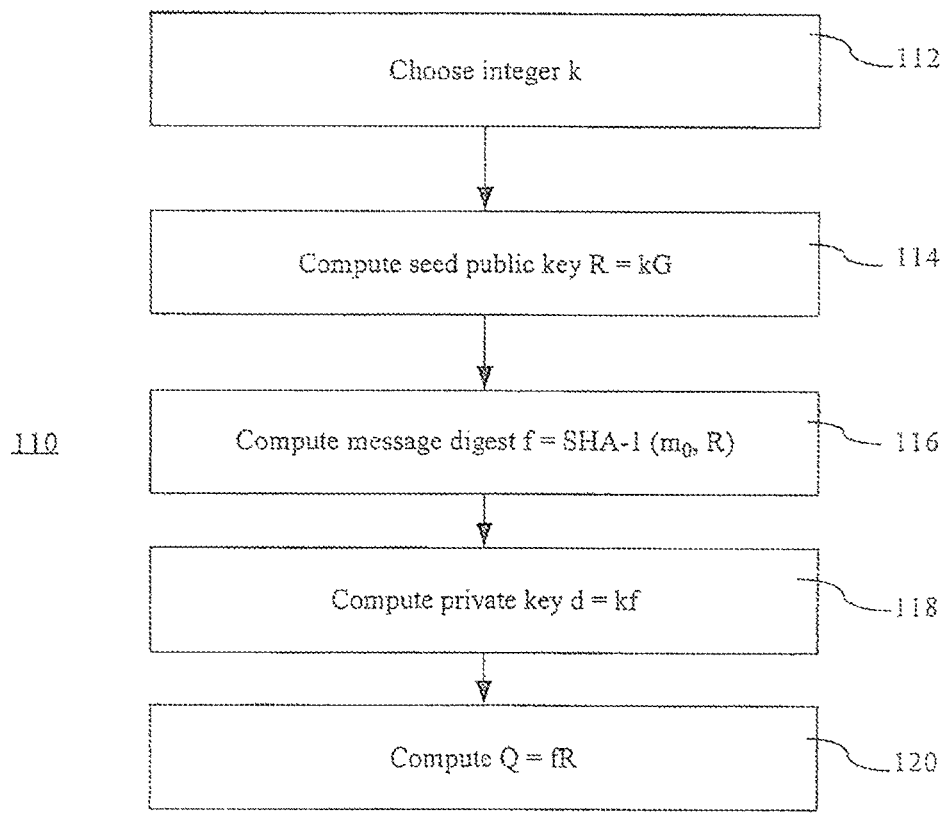
FIG. 5 is a flowchart showing yet another embodiment of a key generation method performed in the communication system of FIG. 1.

In another embodiment shown in FIG. 5, the correspondent performs a method for generating a hashed-exponentiation triple (m, R, Q) consisting of some message m, a seed, or ephemeral, public key R, and a public key Q. This is one alternative to using an ECDSA signature. For convenience, the method is described the method in terms of elliptic curve (EC) public keys. The method is shown generally by the numeral 110.

The correspondent first chooses an integer k in the range [0, n−1] at step 112. Then, the correspondent computes an elliptic curve point R=kG to be used as the seed public key at step 114. At step 116, a message digest f=SHA−1(m, R) in integer form is computed. Then at step 118 the private key d=kf and at step 120, the public key Q=fR is computed.

Figure 6:
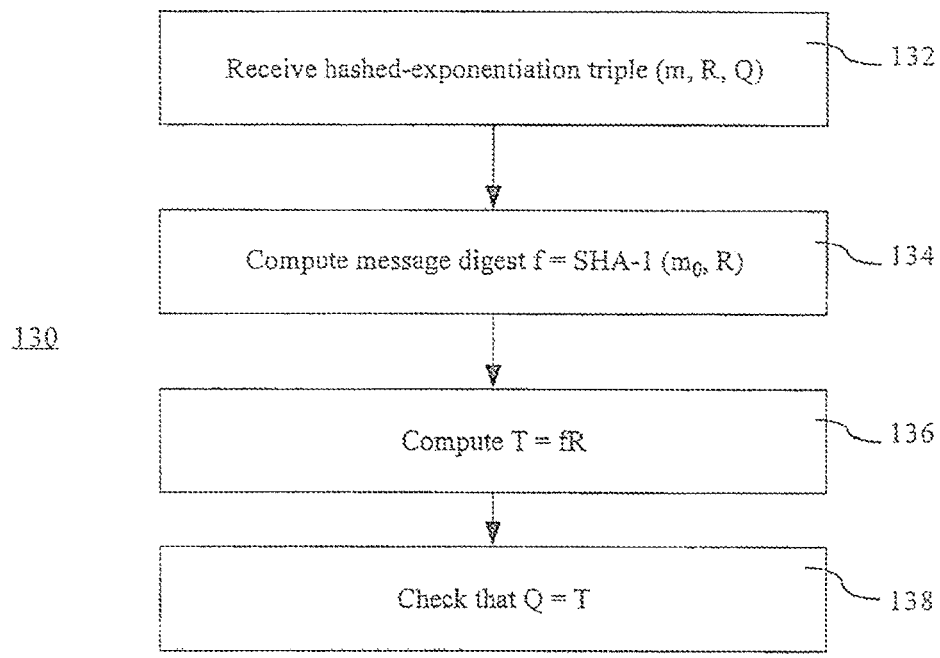
FIG. 6 is a flowchart showing a verification method to be used with a key generated by the method of FIG. 5.

Upon receipt of a hashed-exponentiation triple (m, R, Q), the recipient can verify the triple using the method shown in FIG. 6 by the numeral 130. The verifier first computes the message digest f=SHA−1(m, R) in integer form at step 132. Then the verifier computes T=fR at step 134 and checks at step 136 that Q=T. When Q=T, the hashed-verification triple is accepted by the verifier. Otherwise, it is rejected as invalid.

It is recognized that a hashed-exponentiation triple has similar properties to a self-signed signature and can function in similar ways.

Communications Using Verifiable Key Generation

Figure 7:
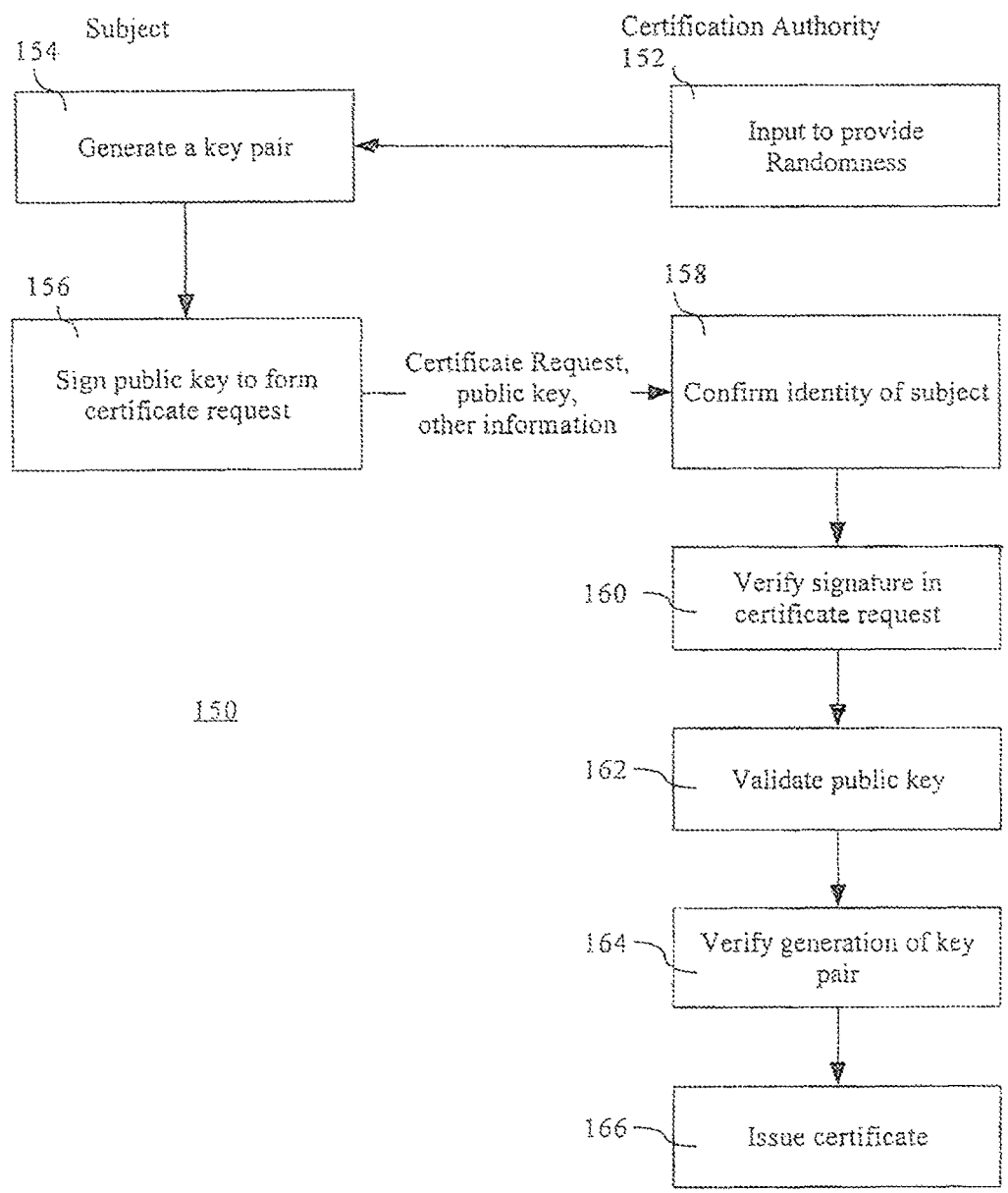
FIG. 7 is a schematic representation of a method performed by the certification authority of FIG. 1.

In a typical communication session in the system of FIG. 1, a user of the system, or the correspondent 12, first initiates communication with the certification authority 14 to obtain the certificate 26. In this case, the correspondent 12 is referred to as the "subject" of the certification. Referring to FIG. 7, the certification authority provides an input to the subject to provide randomness at step 152. The input provided by the certification authority may be a signature of the certification authority, for example. The subject generates a key pair at step 154 and forms a certificate request at step 156. The certificate request is signed by the subject using the subject's self-signed signature. The certificate request may be, for example, the signed public key of the subject, or simply the self-signed signature of the subject. The subject sends the certificate request and the public key to the certification authority for certification. The subject may also send some other information, such as the subject's name, together with the certificate request and the public key. Upon receipt of the certificate request and the public key (and possibly other information), the certification authority typically first confirms the identity of the subject at step 158. The CA then may verify the signature in the certificate request at step 160. The CA validates the public key at 162, which involves a set of tests to ensure that the public key is "valid". The CA then verifies generation of the key pair at step 164. The verification was described in detail above. If the public key passes each test that is performed, then the CA issues a certification at step 166. A certificate includes the digital signature of the CA on the information, which includes the subject's identity and public key.

If the issuing CA of a certificate does public key validation and verification of key generation, then the certificate helps assure another user of the certificate and its public key that the public key is valid, is not stolen, and has sufficient randomness. If the other user of the certificate does not fully trust the issuing CA, then the user may ask to see the additional information that allows the user to perform the public key validation and key generation verification directly.

Various specific embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A computer implemented method of generating a private key of a computing device in a communication system, the computing device having a cryptographic unit, the method comprising:
   the cryptographic unit generating a pair of signature components, one of the pair of signature components generated from an ephemeral private key, the pair of signature components representing a digital signature of a self-signed signature message to bind the computing device to the self-signed signature message;
   the computing device obtaining message data;
   the cryptographic unit generating the self-signed signature message based upon the message data and the digital signature;
   the cryptographic unit computing the private key based upon the self-signed signature message; and
   the cryptographic unit computing a public key based upon the private key such that verification of the self-signed signature message proves that the public key and private key were generated from a key generation process utilizing the self-signed signature message.

2. The method of claim 1, further comprising the computing device receiving at least a portion of the message data from a trusted authority.

3. The method of claim 2, wherein the portion of the message data contains randomness.

4. The method of claim 3, further comprising:
   the computing device sending a request message to a certification authority; and
   the computing device receiving at least the portion of the message data from the certification authority over a secure channel;
wherein at least the portion of the message data is generated by the certification authority from the request message and signed with a private key of the certification authority.

5. The method of claim 1, wherein the pair of signature components, the private key, and the public key are generated based upon a Digital Signature Algorithm (DSA).

6. The method of claim 1, wherein the pair of signature components, the private key, and the corresponding public key are generated based upon an Elliptic Curve Digital Signature Algorithm.

7. The method of claim 1, wherein the pair of signature components includes an integer.

8. The method of claim 1, wherein generating the pair of signature components comprises:
   the cryptographic unit generating an ephemeral public key;
   the cryptographic unit obtaining a salt value; and
   the cryptographic unit computing a hash value of a predetermined number of repetitions of a concatenation of the salt value and the ephemeral public key.

9. The method claim 1, wherein the pair of signature components includes an integer, and generating the pair of signature components comprises:
   the cryptographic unit selecting the ephemeral private key, the ephemeral private key being a value selected at random;
   the cryptographic unit computing an ephemeral public key from the ephemeral private key, the ephemeral public key being a product of the ephemeral private key and an elliptic curve point; and
   the cryptographic unit assigning to the integer an integer value corresponding to the ephemeral public key.

10. The method of claim 1, wherein generating a self-signed signature message based upon the message data and the digital signature comprises concatenating the message data and the pair of signature components into the self-signed signature message, and wherein the computing the private key comprises:
   the cryptographic unit computing a message digest from an integer hash value of the self-signed signature message; and
   the cryptographic unit computing the private key from the digital signature and the message digest.

11. The method of claim 1, wherein the pair of signature components comprises a first integer r and a second integer s and wherein generating the pair of signature components comprises:
   the cryptographic unit selecting the ephemeral private key k, the ephemeral private key k being a non-negative integer smaller than a prime number n;
   the cryptographic unit computing an ephemeral public key from the ephemeral private key k, the ephemeral public key being a product of the ephemeral private key and an elliptic curve point G having the prime number as its order;
   the cryptographic unit assigning an integer value corresponding to the ephemeral public key to the first integer r; and
   the cryptographic unit selecting the second integer s, the second integer being a non-negative integer smaller than the prime number n, the first integer r and the second integer s forming the digital signature.

12. The method of claim 11, wherein computing the private key comprises:
   the cryptographic unit computing a message digest e from an integer hash value of the self-signed signature message; and
   the cryptographic unit computing the private key d using a formula $d=(s\,k-e)/r \bmod n$.

13. The method of claim 12, wherein the cryptographic unit computes the public key Q using a formula $Q=d\,G$.

14. The method of claim 12, wherein the cryptographic unit computes the public key Q using a formula $Q=(1/r \bmod n)(sR-eG)$.

15. The method of claim 11, wherein the cryptographic unit assigning the integer value comprises:
provide a salt value;
computing a hash value for a pre-determined number of repetitions of a concatenation of the salt value and the ephemeral public key; and
assigning an integer value of the hash value to the first integer r.

16. A non-transitory computer readable medium for generating a private key of a computing device in a communication system, the computing device having a cryptographic unit, the non-transitory computer readable medium having stored thereon computer executable instructions for:
the cryptographic unit generating a pair of signature components, one of the pair of signature components generated from an ephemeral private key, the pair of signature components representing a digital signature of a self-signed signature message to bind the computing device to the self-signed signature message;
the computing device obtaining message data;
the cryptographic unit generating the self-signed signature message based upon the message data and the digital signature;
the cryptographic unit computing the private key based upon the self-signed signature message; and
the cryptographic unit computing a public key based upon the private key such that verification of the self-signed signature message proves that the public key and private key were generated from a key generation process utilizing the self-signed signature message.

17. A computing device comprising a cryptographic unit, the computing device configured to perform a method comprising:
the cryptographic unit generating a pair of signature components, one of the pair of signature components generated from an ephemeral private key, the pair of signature components representing a digital signature of a self-signed signature message to bind the computing device to the self-signed signature message;
the computing device obtaining message data;
the cryptographic unit generating the self-signed signature message based upon the message data and the digital signature;
the cryptographic unit computing the private key based upon the self-signed signature message; and
the cryptographic unit computing a public key based upon the private key such that verification of the self-signed signature message proves that the public key and private key were generated from a key generation process utilizing the self-signed signature message.

18. The computing device of claim 17, wherein generating the pair of signature components comprises:
the cryptographic unit generating an ephemeral public key;
the cryptographic unit obtaining a salt value; and
the cryptographic unit computing a hash value of a pre-determined number of repetitions of a concatenation of the salt value and the ephemeral public key.

19. The computing device of claim 17, wherein generating a self-signed signature message based upon the message data and the digital signature comprises concatenating the message data and the pair of signature components into the self-signed signature message, and wherein the computing the private key comprises:
the cryptographic unit computing a message digest from an integer hash value of the self-signed signature message; and
the cryptographic unit computing the private key from the digital signature and the message digest.

* * * * *